United States Patent
Li

(10) Patent No.: US 12,530,496 B2
(45) Date of Patent: Jan. 20, 2026

(54) FILE ANONYMIZATION METHOD AND APPARATUS, AND STORAGE MEDIUM

(71) Applicant: HUAWEI TECHNOLOGIES CO., LTD., Shenzhen (CN)

(72) Inventor: Yonghui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 18/307,986

(22) Filed: Apr. 27, 2023

(65) Prior Publication Data

US 2023/0315906 A1 Oct. 5, 2023

Related U.S. Application Data

(63) Continuation of application No. PCT/CN2021/105808, filed on Jul. 12, 2021.

(30) Foreign Application Priority Data

Oct. 27, 2020 (CN) .......................... 202011166187.4

(51) Int. Cl.
 *G06F 21/62* (2013.01)
 *G06F 16/11* (2019.01)
(52) U.S. Cl.
 CPC ........ *G06F 21/6254* (2013.01); *G06F 16/122* (2019.01)
(58) Field of Classification Search
 CPC ............................ G06F 21/6254; G06F 16/122
 See application file for complete search history.

(56) References Cited

U.S. PATENT DOCUMENTS

| 9,338,220 | B1* | 5/2016 | Kothari | G06F 21/6254 |
| 11,902,257 | B1* | 2/2024 | Kothari | H04L 63/0421 |
| 2015/0007249 | A1* | 1/2015 | Bezzi | G06F 21/6227 726/1 |
| 2016/0162707 | A1* | 6/2016 | Johansson | G06F 21/6254 726/28 |
| 2018/0082082 | A1* | 3/2018 | Lowenberg | G06F 21/602 |

(Continued)

FOREIGN PATENT DOCUMENTS

| CN | 110502515 A | 11/2019 |
| CN | 110532799 A | 12/2019 |

(Continued)

*Primary Examiner* — Stephen T Gundry
(74) *Attorney, Agent, or Firm* — Leydig, Voit & Mayer, Ltd.

(57) ABSTRACT

The present disclosure provides a method, an apparatus, and a storage medium for file anonymization. The method is performed by a storage device. The method includes: receiving a file read command sent by a host, where the file read command is used to request a to-be-read file, the to-be-read file comprises a plurality of data blocks; obtaining the to-be-read file in response to the file read command, where the plurality of data blocks in the to-be-read file comprises one or more first data blocks that do not have anonymization processing performed thereon and one or more second data blocks that have anonymization processing completed thereon; performing anonymization processing on a first data block in the to-be-read file; and sending, to the host, the to-be-read file on which anonymization processing is completed.

20 Claims, 7 Drawing Sheets

(56) References Cited

U.S. PATENT DOCUMENTS

| | | | |
|---|---|---|---|
| 2018/0288099 A1* | 10/2018 | Rubakha | H04L 63/145 |
| 2020/0320406 A1* | 10/2020 | Antonatos | G06F 21/6254 |
| 2022/0129582 A1* | 4/2022 | Lange | G06T 11/00 |
| 2022/0391537 A1* | 12/2022 | Gotthardt | H04W 12/02 |
| 2024/0095400 A1* | 3/2024 | Poe | G06F 11/0766 |
| 2024/0184924 A1* | 6/2024 | Johnson | G16H 10/60 |
| 2024/0187384 A1* | 6/2024 | Brost | G16H 30/20 |
| 2024/0273238 A1* | 8/2024 | Stalling | G16H 30/40 |
| 2024/0329837 A1* | 10/2024 | Cooper | G06F 3/0608 |
| 2024/0362202 A1* | 10/2024 | Chepak, Jr. | G06F 16/2365 |
| 2024/0387031 A1* | 11/2024 | Grantcharov | G16H 40/67 |
| 2025/0021696 A1* | 1/2025 | Nichols | G06F 21/6254 |
| 2025/0045456 A1* | 2/2025 | Huang | G16B 50/00 |
| 2025/0088490 A1* | 3/2025 | Ulrich | G06F 16/95 |
| 2025/0111915 A1* | 4/2025 | Van Meter, II | A61B 5/7475 |

FOREIGN PATENT DOCUMENTS

| | | |
|---|---|---|
| CN | 110795756 A | 2/2020 |
| CN | 111460512 A | 7/2020 |

\* cited by examiner

FILE ANONYMIZATION METHOD AND APPARATUS, AND STORAGE MEDIUM

CROSS-REFERENCE TO RELATED APPLICATIONS

This application is a continuation of International Application No. PCT/CN2021/105808, filed on Jul. 12, 2021, which claims priority to Chinese Patent Application No. 202011166187.4, filed on Oct. 27, 2020. The disclosures of the aforementioned applications are hereby incorporated by reference in their entireties.

FIELD

The present disclosure relates to the field of computer technologies, and in particular, to a file anonymization method and apparatus, and a storage medium.

BACKGROUND

During product development or testing, a file usually need to be obtained from a storage device for related processing. Because the file may include sensitive information related to user privacy, to protect user privacy, anonymization processing needs to be performed on the file that includes sensitive information before the file is used for product development or testing. However, current anonymization processing has problems such as long time consumption and low efficiency. In addition, inefficient anonymization processing may further affect input/output (I/O) efficiency during development or testing.

SUMMARY

In view of this, the present disclosure provides a file anonymization method and apparatus, and a storage medium.

According to a first aspect, an embodiment of the present disclosure provides a file anonymization method, where the method is performed by a storage device, and the method includes: receiving a file read command sent by a host, where the file read command is used to request a to-be-read file; obtaining the to-be-read file in response to the file read command, where anonymization processing is completed on at least some data blocks in the to-be-read file; performing anonymization processing on a data block on which anonymization processing is not performed in the to-be-read file; and sending, to the host, the to-be-read file on which anonymization processing is completed.

The file anonymization method in this embodiment is performed by the storage device. The storage device may receive the file read command sent by the host, and obtain the to-be-read file in response to the file read command, where anonymization processing is completed on the at least some data blocks in the to-be-read file, and then perform anonymization processing on the data block on which anonymization processing is not performed in the to-be-read file, and send, to the host, the to-be-read file on which anonymization processing is completed, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

According to the first aspect, in a first possible implementation of the file anonymization method, the method further includes: storing the to-be-read file on which anonymization processing is completed in a hard disk of the storage device.

In this embodiment, the storage device may store an anonymization result (that is, a to-be-read file on which anonymization processing is completed) each time in the hard disk. As incremental anonymization continues, a purified backup may be formed gradually. The purified backup includes a file on which anonymization processing is completed and a non-sensitive file. A subsequent development or testing activity can be performed based on the purified backup. This reduces unnecessary anonymization, reduces impact of online anonymization on I/O efficiency during development or testing, and improves file read efficiency.

According to the first aspect, in a second possible implementation of the file anonymization method, the method further includes: obtaining a bitmap of the to-be-read file, where the bitmap indicates whether anonymization processing is completed on each data block included in the to-be-read file; and identifying, based on the bitmap, the data block on which anonymization processing is not performed in the to-be-read file.

In this embodiment, the bitmap may be set for the to-be-processed file, and the data block on which anonymization processing is not performed in the to-be-read file is determined by identifying the bitmap of the to-be-read file, which is simple and fast, thereby improving processing efficiency.

According to the first aspect, in a third possible implementation of the file anonymization method, the to-be-read file includes an anonymization mark, and the anonymization mark indicates whether anonymization processing is completed on the to-be-read file; and the method further includes: before the performing anonymization processing on a data block on which anonymization processing is not performed in the to-be-read file, determining, based on the anonymization mark, that the to-be-read file is a file on which anonymization processing is not completed.

In this embodiment, the to-be-read file has the anonymization mark, and the anonymization status of the to-be-read file may be determined based on the anonymization mark, so that management and identification of the anonymization status of the to-be-read file can be implemented.

According to the second possible implementation of the first aspect, in a fourth possible implementation of the file anonymization method, the method further includes: modifying a flag bit corresponding to a data block on which anonymization processing is completed in the bitmap, to indicate that anonymization processing is completed on a corresponding data block.

In this embodiment, for the data block on which anonymization processing is completed in the to-be-read file, a flag bit corresponding to the data block on which anonymization processing is completed in the bitmap may be modified, to indicate that anonymization processing is completed on the data block. In this way, the bitmap may be updated in time based on a change of an anonymization status of the data block in the to-be-read file, to improve accuracy of the bitmap of the to-be-read file.

According to the third possible implementation of the first aspect, in a fifth possible implementation of the file anonymization method, the method further includes: modifying the anonymization mark of the to-be-read file on which anonymization processing is completed, to indicate that anonymization processing is completed on the to-be-read file.

In this embodiment, when anonymization processing is completed on the to-be-read file, that is, when the bitmap of the to-be-processed image indicates that anonymization processing is completed on each data block included in the to-be-read file, the anonymization mark of the to-be-read file may be modified to indicate that anonymization processing is completed on the to-be-read file. In this way, the anonymization mark of the to-be-read file may be updated in time based on a change of the anonymization status of the to-be-read file, so that accuracy of the anonymization mark of the to-be-read file can be improved.

According to the first aspect, in a sixth possible implementation of the file anonymization method, anonymization processing is completed on the at least some data blocks in the to-be-read file through offline anonymization.

In this way, online anonymization can be performed based on offline anonymization, so that offline anonymization and online anonymization can be used together to maintain an anonymization result.

According to one or more of the first aspect or the possible implementations of the first aspect, in a seventh possible implementation of the file anonymization method, the to-be-read file includes at least one of a text file, a report file, a picture file, an audio file, and a video file.

In this embodiment, the to-be-read file may include at least one of a text file, a report file, a picture file, an audio file, and a video file, and may further include other unstructured data such as an office document, an Extensible Markup Language (XML [[,]]) file, and an HyperText Markup Language (HTML) file. In this way, anonymization processing may be performed on various unstructured data in the foregoing manner.

According to a second aspect, an embodiment of the present disclosure provides a file anonymization apparatus, where the apparatus is applied to a storage device, and the apparatus includes: a command receiving module, configured to receive a file read command sent by a host, where the file read command is used to request a to-be-read file; a file obtaining module, configured to obtain the to-be-read file in response to the file read command, where anonymization processing is completed on at least some data blocks in the to-be-read file; an anonymization processing module, configured to perform anonymization processing on a data block on which anonymization processing is not performed in the to-be-read file; and a file sending module, configured to send, to the host, the to-be-read file on which anonymization processing is completed.

The file anonymization apparatus in this embodiment is applied to the storage device, and may receive the file read command sent by the host, and obtain the to-be-read file in response to the file read command, where anonymization processing is completed on the at least some data blocks in the to-be-read file, and then perform anonymization processing on the data block on which anonymization processing is not performed in the to-be-read file, and send, to the host, the to-be-read file on which anonymization processing is completed, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

According to the second aspect, in a first possible implementation of the file anonymization apparatus, the apparatus further includes: a file storage module, configured to store the to-be-read file on which anonymization processing is completed in a hard disk of the storage device.

In this embodiment, the storage device may store an anonymization result (that is, a to-be-read file on which anonymization processing is completed) each time in the hard disk. As incremental anonymization continues, a purified backup may be formed gradually. The purified backup includes a file on which anonymization processing is completed and a non-sensitive file. A subsequent development or testing activity can be performed based on the purified backup. This reduces unnecessary anonymization, reduces impact of online anonymization on I/O efficiency during development or testing, and improves file read efficiency.

According to the second aspect, in a second possible implementation of the file anonymization apparatus, the apparatus further includes: a bitmap obtaining module, configured to obtain a bitmap of the to-be-read file, where the bitmap indicates whether anonymization processing is completed on each data block included in the to-be-read file; and a data block identification module, configured to identify, based on the bitmap, a data block on which anonymization processing is not performed in the to-be-read file.

In this embodiment, the bitmap may be set for the to-be-processed file, and the data block on which anonymization processing is not performed in the to-be-read file is determined by identifying the bitmap of the to-be-read file, which is simple and fast, thereby improving processing efficiency.

According to the second aspect, in a third possible implementation of the file anonymization apparatus, the to-be-read file includes an anonymization mark, and the anonymization mark indicates whether anonymization processing is completed on the to-be-read file; and the apparatus further includes: a file anonymization identification module, configured to: before anonymization processing is performed on the data block on which anonymization processing is not performed in the to-be-read file, determine, based on the anonymization mark, that the to-be-read file is a file on which anonymization processing is not completed.

In this embodiment, the to-be-read file has the anonymization mark, and the anonymization status of the to-be-read file may be determined based on the anonymization mark, so that management and identification of the anonymization status of the to-be-read file can be implemented.

According to the second possible implementation of the second aspect, in a fourth possible implementation of the file anonymization apparatus, the apparatus further includes: a bitmap modifying module, configured to modify a flag bit corresponding to a data block on which anonymization processing is completed in the bitmap, to indicate that anonymization processing is completed on a corresponding data block.

In this embodiment, for the data block on which anonymization processing is completed in the to-be-read file, a flag bit corresponding to the data block on which anonymization processing is completed in the bitmap may be modified, to indicate that anonymization processing is completed on the data block. In this way, the bitmap may be updated in time based on a change of an anonymization status of the data block in the to-be-read file, to improve accuracy of the bitmap of the to-be-read file.

According to the third possible implementation of the second aspect, in a fifth possible implementation of the file anonymization apparatus, the apparatus further includes: an anonymization tag modifying module, configured to modify the anonymization tag of the to-be-read file on which anonymization processing is completed, to indicate that anonymization processing is completed on the to-be-read file.

In this embodiment, when anonymization processing is completed on the to-be-read file, that is, when the bitmap of the to-be-processed image indicates that anonymization processing is completed on each data block included in the to-be-read file, the anonymization mark of the to-be-read file may be modified to indicate that anonymization processing is completed on the to-be-read file. In this way, the anonymization mark of the to-be-read file may be updated in time based on a change of the anonymization status of the to-be-read file, so that accuracy of the anonymization mark of the to-be-read file can be improved.

According to the second aspect, in a sixth possible implementation of the file anonymization apparatus, anonymization processing is completed on the at least some data blocks in the to-be-read file through offline anonymization.

In this way, online anonymization can be performed based on offline anonymization, so that offline anonymization and online anonymization can be used together to maintain an anonymization result.

According to one or more of the second aspect or the possible implementations of the second aspect, in a seventh possible implementation of the file anonymization apparatus, the to-be-read file includes at least one of a text file, a report file, a picture file, an audio file, and a video file.

In this embodiment, the to-be-read file may include at least one of a text file, a report file, a picture file, an audio file, and a video file, and may further include other unstructured data such as an office document, an Extensible Markup Language (XML) file, and an HyperText Markup Language (HTML) file. In this way, anonymization processing may be performed on various unstructured data in the foregoing manner.

According to a third aspect, an embodiment of the present disclosure provides a file anonymization apparatus, including a processor and a memory that is configured to store processor executable instructions. When executing the instructions, the processor is configured to implement the file anonymization method according to one or more of the first aspect or the possible implementations of the first aspect.

The file anonymization apparatus in this embodiment is applied to a storage device, and may receive a file read command sent by a host, and obtain a to-be-read file in response to the file read command, where anonymization processing is completed on at least some data blocks in the to-be-read file, and then perform anonymization processing on a data block on which anonymization processing is not performed in the to-be-read file, and send, to the host, the to-be-read file on which anonymization processing is completed, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

According to a fourth aspect, an embodiment of the present disclosure provides a non-volatile computer-readable storage medium The non-volatile computer-readable storage medium stores computer program instructions, and when the computer program instructions are executed by a processor, the file anonymization method according to one or more of the first aspect or the possible implementations of the first aspect is implemented.

According to this embodiment of the present disclosure, the file read command sent by the host is received, and the to-be-read file is obtained in response to the file read command, anonymization processing is completed on the at least some data blocks in the to-be-read file, and then anonymization processing is performed on the data block on which anonymization processing is not performed in the to-be-read file, and the to-be-read file on which anonymization processing is completed is sent to the host, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

According to a fifth aspect, an embodiment of the present disclosure provides a computer program product, including computer-readable code or a non-volatile computer-readable storage medium carrying computer-readable code. When the computer-readable code runs in an electronic device, a processor in the electronic device performs the file anonymization method according to one or more of the first aspect or the possible implementations of the first aspect.

According to this embodiment of the present disclosure, a file read command sent by a host is received, and a to-be-read file is obtained in response to the file read command, anonymization processing is completed on at least some data blocks in the to-be-read file, and then anonymization processing is performed on a data block on which anonymization processing is not performed in the to-be-read file, and the to-be-read file on which anonymization processing is completed is sent to the host, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

These aspects and other aspects of the present disclosure are more concise and more comprehensive in descriptions of the following embodiments.

BRIEF DESCRIPTION OF DRAWINGS

The accompanying drawings included in this specification and constituting a part of this specification and this specification jointly show example embodiments, features, and aspects of the present disclosure, and are intended to explain the principles of the present disclosure.

DESCRIPTION OF EMBODIMENTS

Figure 1:
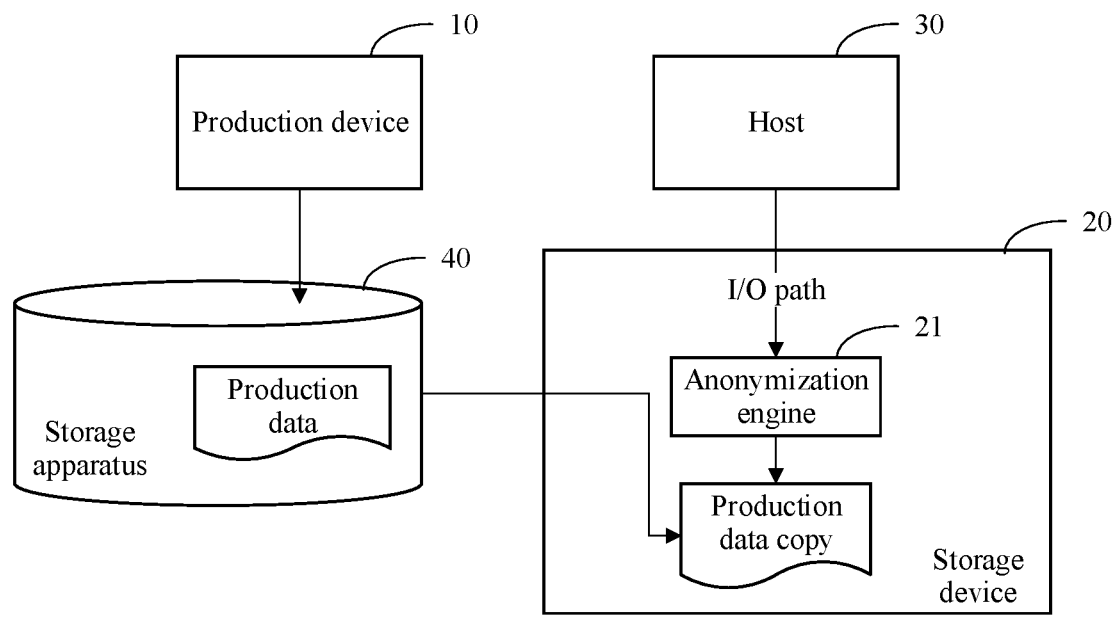
FIG. 1 is a schematic diagram of an application scenario of a file anonymization method according to an embodiment of the present disclosure.

The following describes various example embodiments, features, and aspects of the present disclosure in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as "example" is not necessarily explained as being superior or better than other embodiments.

In addition, to better describe the present disclosure, numerous specific details are given in the following exemplary implementations. Persons skilled in the art should understand that the present disclosure can also be implemented without some specific details. In some embodiments, methods, means, elements and circuits that are well-known to persons skilled in the art are not described in detail, so that the subject matter of the present disclosure is highlighted.

In a related technology, anonymization processing refers to identifying sensitive information in a to-be-anonymized object (for example, data or a file), and modifying the sensitive information by hiding, obfuscation, or the like, to hide the sensitive information, to implement reliable protection of the sensitive information.

Anonymization processing may include online anonymization and offline anonymization. During product development or testing, online anonymization is a process in which an anonymization engine (used to perform anonymization) identifies sensitive information in a file in real time when a host reads or accesses the file, performs anonymization on the sensitive information, and sends a file on which anonymization processing is completed to the host for use. That is, during online anonymization, the anonymization engine needs to perform anonymization processing once each time the host reads or accesses a file. The processing efficiency is low, and there may be unnecessary anonymization processing for a plurality of times. For example, if the host reads a same file for a plurality of times, the anonymization engine performs anonymization processing on the file for a plurality of times. In addition, during online anonymization, the anonymization engine needs to intercept an I/O file and send the file to the host only after anonymization processing is complete. This greatly affects I/O efficiency during development testing.

Offline anonymization means that before product development or testing, the anonymization engine performs anonymization processing on all files used during development or testing through enumeration, traversal, or the like, and stores a file on which anonymization processing is completed. After offline anonymization is completed, a product development or testing activity is performed based on the stored file on which anonymization processing is completed. Online anonymization is not required during the development or testing.

For example, for backup data that includes a plurality of files and is used during product development or testing, for example, a backup logical unit number (LUN, where the backup data is stored on a device corresponding to the logical unit number), when offline anonymization is performed, an anonymization mirror may be created based on the backup LUN, and a file on which anonymization processing is completed is written into the anonymization mirror. After the offline anonymization is completed, the anonymization mirror is a purified mirror that does not contain sensitive information. A development or testing activity is performed based on the purified mirror.

However, limitation of offline anonymization is that a development or testing activity can be started only after the offline anonymization is completed, and waiting time is long. If the offline anonymization is not performed, the development or testing activity cannot be performed.

To resolve the foregoing technical problem, the present disclosure provides a file anonymization method. The file anonymization method in embodiments of the present disclosure may be applied to a storage device. The storage device may receive a file read command sent by a host, and obtain a to-be-read file in response to the file read command, where anonymization processing is completed on at least some data blocks in the to-be-read file, and then perform anonymization processing on a data block on which anonymization processing is not performed in the to-be-read file, and send the to-be-read file on which anonymization processing is completed to the host. In this way, incremental anonymization can be performed on the to-be-read file, so that a previous anonymization result can be fully used to improve file anonymization efficiency, and online anonymization and offline anonymization can be combined, so that a product development or testing activity can be performed at any time.

FIG. 1 is a schematic diagram of an application scenario of a file anonymization method according to an embodiment of the present disclosure. The application scenario shown in FIG. 1 provides an anonymization system, including a production device 10, a storage device 20, and a host 30. The file anonymization method in this embodiment is applied to the storage device 20, and may be executed by an anonymization engine 21 in the storage device 20.

The production device 10 may be an electronic device of any form, for example, a server, a desktop computer, a mainframe computer, and any other type of computing device that includes a processor and a memory. The production device 10 stores production data in a storage apparatus 40. The production data is an original file from a user, and may include information related to user privacy. To prevent user privacy leakage, anonymization processing needs to be performed on the production data. The storage apparatus 40 may be a memory located inside the production device 10, or may be a memory of a device located outside the production device 10. The external device may communicate with the production device 10, and is configured to store production data from the production device 10. The external device may be any form of electronic device, such as a server, a desktop computer, a mainframe computer, a storage array, and any other type of computing device that includes a processor and a memory.

The host 30 mainly refers to a development/test server. A developer/tester obtains a file from the storage device 20 by using the host 30 for product development or testing. In this embodiment, a file provided by the storage device 20 to the host 30 is a file obtained through anonymization processing, to ensure user privacy. In terms of product form, the host 30 may be any form of electronic device, for example, a server, a desktop computer, a mobile device, and any other type of computing device that includes a processor and a memory.

The storage device 20 may be a network attached storage (NAS) device. The NAS device is a dedicated high-performance file storage device, and provides file data, through a network and a file sharing protocol, for a user to access. Protocols used between the storage device 20 and the host 30 include a TCP/IP protocol used for data transmission, a CIFS protocol used for a network file service, an NFS protocol, and the like. In this case, an NFS/CIFS client is configured in the host 30, and a specific file is accessed by specifying a file name, a location, or another attribute in a read command through the NFS/CIFS client. Correspondingly, the storage device 20 is configured with an NFS/CIFS server, and the NFS/CIFS server parses the read command. Because a file system records a location of the file in a hard disk, the storage device 20 may convert the file name and the location in the received read command into the address of the file to obtain the file.

The storage device 20 may alternatively be a storage area network (SAN) device, and the SAN device communicates with the host 30 through a fiber channel network. The SAN device in this embodiment has a file system, and can perform file access. In addition to the NAS device and the SAN device, the storage device 20 may alternatively be another device having a storage function, and the anonymization system may include one or more storage devices 20. A quantity of the storage devices 20 is not limited in this embodiment.

Because the production data stored in the production device 10 is original data, if anonymization processing is performed on the original data directly, the data is damaged and is difficult to be restored. Therefore, in the application scenario shown in FIG. 1, the production data is sent to the storage device 20 as a copy for storage, and the storage device 20 performs anonymization processing on the copy instead of the original data.

Figure 2:
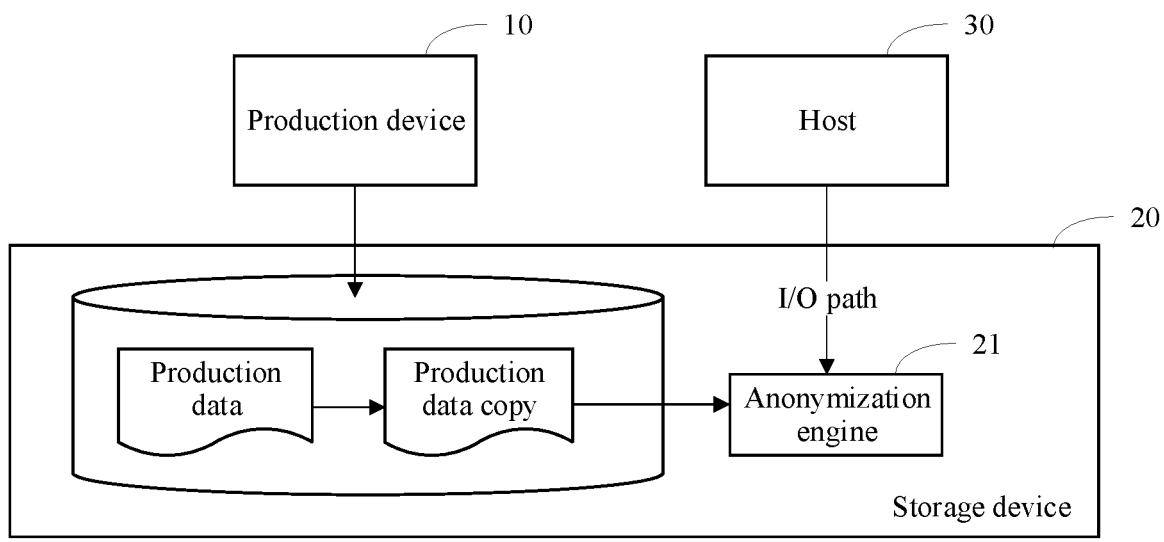
FIG. 2 is a schematic diagram of an application scenario of a file anonymization method according to an embodiment of the present disclosure.

FIG. 2 is a schematic diagram of an application scenario of a file anonymization method according to an embodiment of the present disclosure. An application scenario shown in FIG. 2 is similar to the scenario shown in FIG. 1. A difference lies in that a production device 10 may directly store production data in a storage device 20. To prevent original production data from being damaged, the storage device 20 creates a copy of the production data, and performs anonymization processing on the copy. In other words, in the scenario shown in FIG. 2, both the production data and the copy of the production data are in the storage device 20. There are a plurality of manners of creating a copy, for example, replication, a snapshot, and a clone. Details are not described herein.

Figure 3:
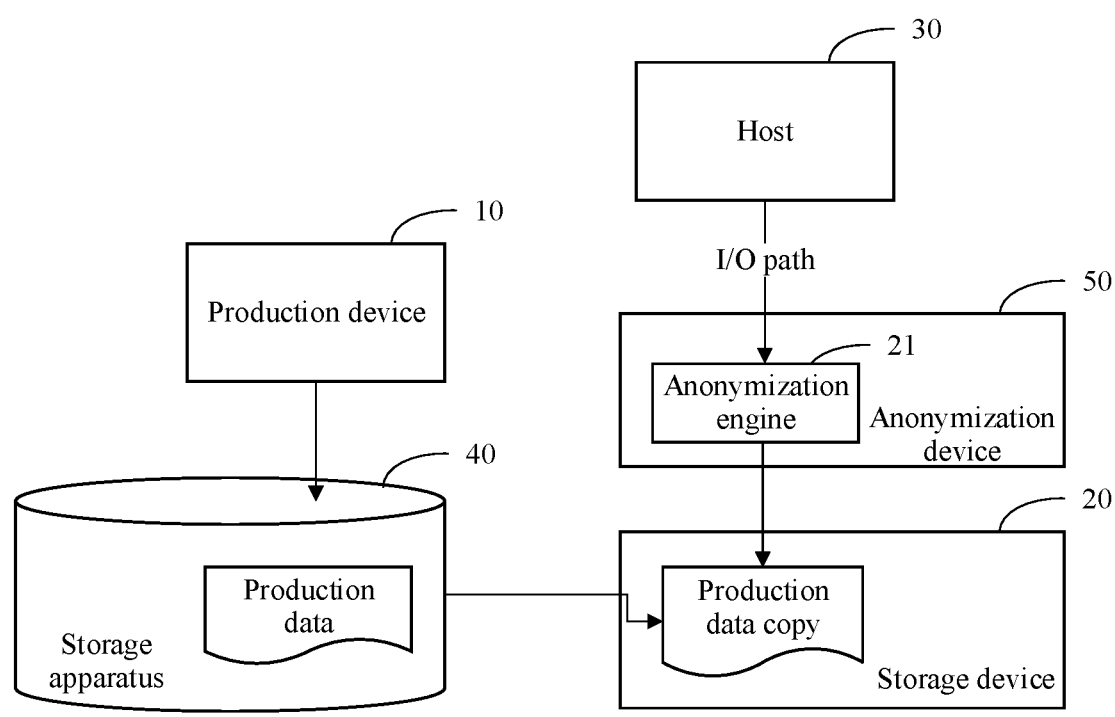
FIG. 3 is a schematic diagram of an application scenario of a file anonymization method according to an embodiment of the present disclosure.

FIG. 3 is a schematic diagram of an application scenario of a file anonymization method according to an embodiment of the present disclosure. The application scenario shown in FIG. 3 provides an anonymization system, including a production device 10, a storage device 20, a host 30, and an anonymization device 50. A difference from the application scenario shown in FIG. 1 lies in that the application scenario shown in FIG. 3 provides an independent anonymization device 50, configured to perform anonymization processing on a file read by the host 30. The anonymization device 50 includes an anonymization engine 21.

In terms of product form, the anonymization device 50 may be any form of electronic device, such as a server, a desktop computer, a mobile device, and any other type of computing device that includes a processor and a memory.

The production device 10, the storage device 20 (in which an anonymization engine is not included), and the host 30 in the application scenario shown in FIG. 3 are all similar to those in FIG. 1, and details are not described herein.

In another possible application scenario, an anonymization system may include at least two anonymization engines. For example, it is assumed that the anonymization system includes two anonymization engines: a first anonymization engine located in an anonymization device and a second anonymization engine located in a storage device. The two anonymization engines may be respectively configured to perform different anonymization processing. For example, the first anonymization engine is configured to perform online anonymization, and the second anonymization engine is configured to perform offline anonymization; or the first anonymization engine is configured to perform offline anonymization, and the second anonymization engine is configured to perform online anonymization. The two anonymization engines may alternatively perform same anonymization processing. For example, both the anonymization engines may perform online anonymization or offline anonymization. It should be noted that persons skilled in the art may set, based on an actual situation, a quantity of anonymization engines in the anonymization system and anonymization processing performed by each anonymization engine, which is not limited in this embodiment.

Figure 4:
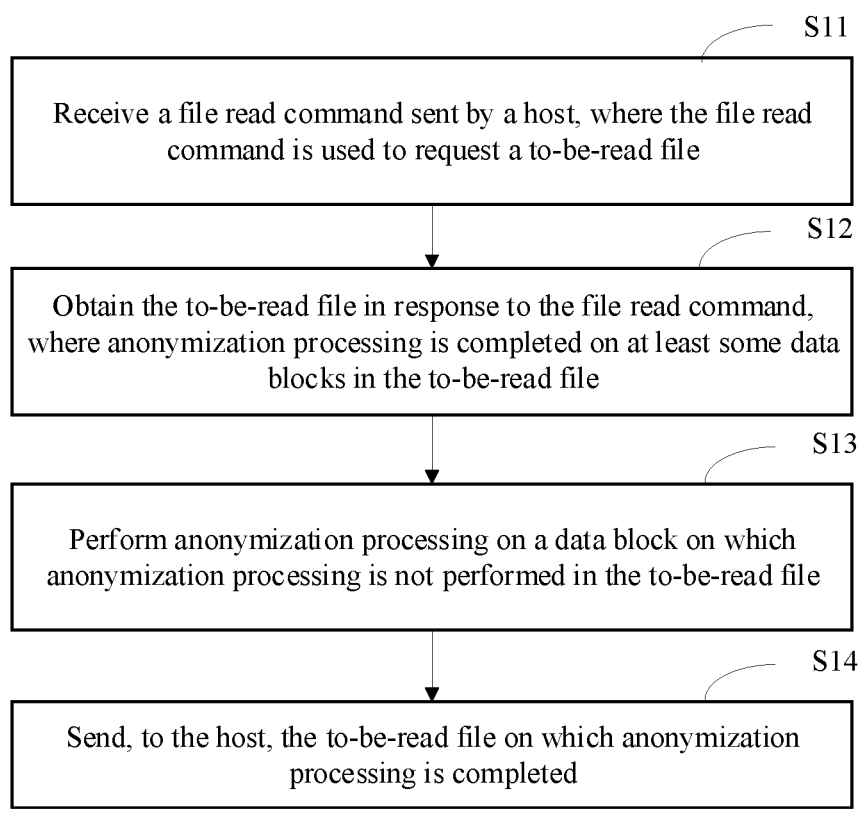
FIG. 4 is a flowchart of a file anonymization method according to an embodiment of the present disclosure.

FIG. 4 is a flowchart of a file anonymization method according to an embodiment of the present disclosure. As shown in FIG. 4, the file anonymization method is performed by a storage device 20, and the method includes step S11 to step S14.

In step S11, receive a file read command sent by a host, where the file read command is used to request a to-be-read file.

In this embodiment, when a developer/tester obtains a file from the storage device by using the host, the host may send the file read command to the storage device through an I/O path, and the storage device may receive the file read command sent by the host, where the file read command is used to request a to-be-read file.

In a possible implementation, the to-be-read file may include at least one of a text file, a report file, a picture file, an audio file, and a video file. The to-be-read file may further include other unstructured data such as an office document, an Extensible Markup Language (XML) file, and an Hyper-Text Markup Language (HTML) file. A specific type of the to-be-read file is not limited in this embodiment.

In step S12, obtain the to-be-read file in response to the file read command, where anonymization processing is completed on the at least some data blocks in the to-be-read file.

In this embodiment, after receiving the file read command sent by the host, the storage device may determine, in response to the file read command, a storage address of the to-be-read file based on information such as a file name and a location in the file read command, and obtain the to-be-read file based on the storage address.

Anonymization processing is completed on the at least some data blocks in the to-be-read file. In other words, the to-be-read file may be divided into a plurality of data blocks, and anonymization processing is completed on some of the data blocks.

In a possible implementation, anonymization processing may be completed on the at least some data blocks in the to-be-read file through offline anonymization.

For example, when product development or testing is not performed, anonymization processing may be performed on the to-be-read file through offline anonymization. Specifically, the to-be-read file may be divided into a plurality of data blocks of a specific size (for example, 4 KB). For example, the to-be-read file is divided into five data blocks, and anonymization processing is performed on the to-be-read file through offline anonymization. When anonymization processing is completed on three data blocks, that is, a quantity of data blocks on which anonymization processing is completed is 3, if product development or testing is required, offline anonymization may be stopped, the three data blocks on which anonymization processing is completed are stored in a hard disk of the storage device, an anonymization status of each data block is recorded using a bitmap, array, or matrix, and anonymization processing is switched to online anonymization. That is, during development or testing, anonymization processing is performed on the two data blocks on which anonymization processing is not performed in the to-be-read file through online anonymization.

In this way, online anonymization can be performed based on offline anonymization, so that offline anonymization and online anonymization can be used together to maintain an anonymization result.

In a possible implementation, anonymization processing may be completed on the at least some data blocks in the to-be-read file through online anonymization.

For example, it is assumed that the host and the storage device support both overall access to the to-be-read file and independent access to each data block in the to-be-read file. The to-be-read file includes five data blocks, and offline anonymization is not performed on the to-be-read file. When the host reads a file for the first time, a first data block of the to-be-read file is read. The storage device may perform online anonymization on the first data block of the to-be-read file, and send the first data block on which anonymization processing is completed to the host, and stores the first data block on which anonymization processing is completed in the hard disk of the storage device, and then records an anonymization status of the first data block. When the host reads a file again, the to-be-read file is read. The storage device may obtain the to-be-read file in response to the file read command, and perform online anonymization. Anonymization processing is completed on one data block (that is, the first data block) of the to-be-read file.

In this way, incremental anonymization can be continuously performed through online anonymization based on the previous online anonymization, so that an anonymization result can be maintained together after a plurality of times of online anonymization.

In step S13, perform anonymization processing on a data block on which anonymization processing is not performed in the to-be-read file.

In this embodiment, the storage device may identify the data block on which anonymization processing is not performed in the to-be-read file, and perform anonymization processing on the data block on which anonymization processing is not performed in the to-be-read file.

In a possible implementation, anonymization processing may be performed in a manner such as value/character string replacement, invalidation, randomization, shift and rounding, and masking by using a mask. A manner of anonymization processing is described as an example below.

Example 1: Anonymization Processing is Performed Through Value/Character String Replacement Value/character string replacement is to replace a real value or character string with a fixed fictional value. For example, a file existing before anonymization processing is shown in Table 1. For the mobile number in Table 1, a function mobile=13800013800 may be used to assign a value to the mobile number field and replace the mobile number with 13800013800. As shown in Table 2, the following table lists files obtained after anonymization processing is performed on mobile numbers through value replacement. In Table 2, mobile numbers obtained after anonymization processing are displayed as 13800013800, and actual values of the mobile numbers are hidden.

TABLE 1

Files existing before anonymization processing

| Sequence number | Code | Name | Address | Mobile number | ID card number | Operation time |
|---|---|---|---|---|---|---|
| 1 | 100000 | Zhang San | City A, Sichuan Province | 138####8611 | 51132119######0672 | 2020-5-30 15:01:56 |
| 2 | 100001 | Li Si | City A, Sichuan Province | 133####6953 | 51132119######0611 | 2020-6-30 16:56:03 |
| 3 | 100002 | Wang Wu | District B, Shenzhen | 186####9898 | 51121019######5582 | 2020-4-30 16:01:50 |
| 4 | 100003 | Zhao Liu | District C, Shenzhen | 180####9465 | 46003319######0651 | 2020-7-30 16:15:03 |
| 5 | 100004 | Qian Qi | District D, Shenzhen | 181####7898 | 46003119######0818 | 2020-9-30 17:20:50 |

TABLE 2

File obtained after anonymization processing is performed on a mobile number

| Sequence number | Code | Name | Address | Mobile number | ID card number | Operation time |
|---|---|---|---|---|---|---|
| 1 | 100000 | Zhang San | City A, Sichuan Province | 13800138000 | 51132119######0672 | 2020-5-30 15:01:56 |

TABLE 2-continued

| | | | | File obtained after anonymization processing is performed on a mobile number | | | |
|---|---|---|---|---|---|---|---|
| Sequence number | Code | Name | Address | Mobile number | ID card number | Operation time | |
| 2 | 100001 | Li Si | City A, Sichuan Province | 13800138000 | 51132119######0611 | 2020-6-30 16:56:03 | |
| 3 | 100002 | Wang Wu | District B, Shenzhen | 13800138000 | 51121019######5582 | 2020-4-30 16:01:50 | |
| 4 | 100003 | Zhao Liu | District C, Shenzhen | 13800138000 | 46003319######0651 | 2020-7-30 16:15:03 | |
| 5 | 100004 | Qian Qi | District D, Shenzhen | 13800138000 | 46003119######0818 | 2020-9-30 17:20:50 | |

Herein, # indicates any one of digits from 0 to 9.

Example 2: Anonymization Processing is Performed Through Invalidation

That anonymization processing is performed through invalidation means that sensitive data is anonymized through truncation, encryption, hiding, and the like, so that the sensitive data is no longer valuable. For example, an address is replaced with ****, so that a real value is replaced. An effect of data invalidation is similar to an effect of data replacement. For example, anonymization processing in a hidden manner may be performed on the address in Table 1. Specifically, an address field may be hidden by using a function address="*****", to achieve an anonymization effect. Table 3 shows a file obtained after anonymization processing in a hidden manner is performed on an address.

TABLE 3

| | | | File obtained after anonymization processing is performed on an address | | | |
|---|---|---|---|---|---|---|
| Sequence number | Code | Name | Address | Mobile number | ID card number | Operation time |
| 1 | 100000 | Zhang San | ******* | 138####8611 | 51132119######0672 | 2020-5-30 15:01:56 |
| 2 | 100001 | Li Si | ******* | 133####6953 | 51132119######0611 | 2020-6-30 16:56:03 |
| 3 | 100002 | Wang Wu | ******* | 186####9898 | 51121019######5582 | 2020-4-30 16:01:50 |
| 4 | 100003 | Zhao Liu | ******* | 180####9465 | 46003319######0651 | 2020-7-30 16:15:03 |
| 5 | 100004 | Qian Qi | ******* | 181####7898 | 46003119######0818 | 2020-9-30 17:20:50 |

Optionally, in the foregoing example, anonymization may alternatively be performed on the address field in a truncated manner, that is, only some information is hidden. Specifically, a function address=left (address,3)+"****" may be used to add **** to the left three characters of an address source character string. Table 4 shows a file obtained after anonymization processing in a truncated manner is performed on an address.

TABLE 4

| | | | File obtained after anonymization processing is performed on an address | | | |
|---|---|---|---|---|---|---|
| Sequence number | Code | Name | Address | Mobile number | ID card number | Operation time |
| 1 | 100000 | Zhang San | ***, Sichuan Province | 138####8611 | 51132119######0672 | 2020-5-30 15:01:56 |
| 2 | 100001 | Li Si | ***, Sichuan Province | 133####6953 | 51132119######0611 | 2020-6-30 16:56:03 |
| 3 | 100002 | Wang Wu | ***, Shenzhen | 186####9898 | 51121019######5582 | 2020-4-30 16:01:50 |
| 4 | 100003 | Zhao Liu | ***, Shenzhen | 180####9465 | 46003319######0651 | 2020-7-30 16:15:03 |
| 5 | 100004 | Qian Qi | ***, Shenzhen | 181####7898 | 46003119######0818 | 2020-9-30 17:20:50 |

Example 3: Anonymization Processing is Performed Through Randomization

That anonymization processing is performed through randomization means that random data is used to replace a real value or character string to ensure randomness of the replaced value and simulate authenticity of a sample. For example, replace a real name with a randomly generated name, or replace a real value with a random number within a specified range.

Specifically, a function A1(rand(A1.len( )+1)+B1(rand(B1.len( )+1)) may be used to randomize the name (a name is generated by combining in a random manner A1 "last name.txt" and B1 "name.txt" external dictionary tables). Table 5 shows a file obtained after anonymization processing is performed on a name through randomization.

TABLE 5

| | | | File obtained after anonymization processing is performed on a name | | | |
|---|---|---|---|---|---|---|
| Sequence number | Code | Name | Address | Mobile number | ID card number | Operation time |
| 1 | 100000 | Zhang Yi | City A, Sichuan Province | 138####8611 | 51132119######0672 | 2020-5-30 15:01:56 |
| 2 | 100001 | Li Er | City A, Sichuan Province | 133####6953 | 51132119######0611 | 2020-6-30 16:56:03 |
| 3 | 100002 | Wang San | District B, Shenzhen | 186####9898 | 51121019######5582 | 2020-4-30 16:01:50 |
| 4 | 100003 | Zhao Si | District C, Shenzhen | 180####9465 | 46003319######0651 | 2020-7-30 16:15:03 |
| 5 | 100004 | Qian Wu | District D, Shenzhen | 181####7898 | 46003119######0818 | 2020-9-30 17:20:50 |

Example 4: Anonymization Processing is Performed Through Shift and Rounding

Shift and rounding are used to change digital data through a random shift. For example, a date 2018 Jan. 2 8:12:25 is changed to 2018 Jan. 2 8:00:00. Offset and rounding ensure data security when ensuring general authenticity in terms of range. This function is of significant value in a big data utilization environment.

Specifically, a function string (operatetime, "yyyy-MM-dd HH:00:00") may be used to implement formatting into a "yyyy-MM-dd HH:00:00" format based on a shift and rounding rule. Table 6 shows a file obtained after anonymization processing through shift and rounding is performed on an operation time.

TABLE 6

| | | | File obtained after anonymization processing is performed on an operation time | | | |
|---|---|---|---|---|---|---|
| Sequence number | Code | Name | Address | Mobile number | ID card number | Operation time |
| 1 | 100000 | Zhang San | City A, Sichuan Province | 138####8611 | 51132119######0672 | 2020-5-30 15:00:00 |
| 2 | 100001 | Li Si | City A, Sichuan Province | 133####6953 | 51132119######0611 | 2020-6-30 16:00:00 |
| 3 | 100002 | Wang Wu | District B, Shenzhen | 186####9898 | 51121019######5582 | 2020-4-30 16:00:00 |
| 4 | 100003 | Zhao Liu | District C, Shenzhen | 180####9465 | 46003319######0651 | 2020-7-30 16:00:00 |
| 5 | 100004 | Qian Qi | District D, Shenzhen | 181####7898 | 46003119######0818 | 2020-9-30 17:00:00 |

Example 5: Anonymization Processing is
Performed Through Masking by Using a Mask Masking by using a mask is a useful tool for anonymization of some information of account-type data, such as anonymization of a bank card number and an ID card number. Whether to mask all or part of the data (masked ranges, for example, last X digits and middle X digits) may be specified. For example, anonymization is performed on a birth date in an ID card number through masking by using a mask.

Specifically, a function left (string (idnumber),6)+ ********+right (string (idnumber),4) may be used for masking by using a mask on the ID card number. Table 7 shows a file obtained after anonymization processing is performed on an ID card number through masking by using a mask.

In a possible implementation, the method may further include: storing the to-be-read file on which anonymization processing is completed in the hard disk of the storage device.

In this embodiment, the storage device may store an anonymization result (that is, a to-be-read file on which anonymization processing is completed) each time in the hard disk. For example, a specific location may be selected to store a file on which anonymization is completed. As incremental anonymization continues, a purified backup may be formed gradually. The purified backup includes a file on which anonymization processing is completed and a non-sensitive file. A subsequent development or testing activity can be performed based on the purified backup. This reduces unnecessary anonymization, reduces impact of online anonymization on I/O efficiency during development or testing, and improves file read efficiency.

TABLE 7

File obtained after anonymization processing is performed on an ID card number

| Sequence number | Code | Name | Address | Mobile number | ID card number | Operation time |
|---|---|---|---|---|---|---|
| 1 | 100000 | Zhang San | City A, Sichuan Province | 138####8611 | 511321********0672 | 2020-5-30 15:01:56 |
| 2 | 100001 | Li Si | City A, Sichuan Province | 133####6953 | 511321********0611 | 2020-6-30 16:56:03 |
| 3 | 100002 | Wang Wu | District B, Shenzhen | 186####9898 | 511210********5582 | 2020-4-30 16:01:50 |
| 4 | 100003 | Zhao Liu | District C, Shenzhen | 180####9465 | 460033********0651 | 2020-7-30 16:15:03 |
| 5 | 100004 | Qian Qi | District D, Shenzhen | 181####7898 | 460031********0818 | 2020-9-30 17:20:50 |

It should be noted that, although the foregoing example is used to describe an exemplary manner of anonymization processing, persons skilled in the art should understand that an exemplary manner of anonymization processing is not limited thereto, and may further include another manner. During anonymization processing, persons skilled in the art may select one or more exemplary manners based on an actual situation, which is not limited in this embodiment.

In step S14, the to-be-read file on which anonymization processing is completed is sent to the host.

In this embodiment, when anonymization processing is completed on all data blocks in the to-be-read file, the to-be-read file on which anonymization processing is completed may be obtained, and the storage device may send, to the host, the to-be-read file on which anonymization processing is completed, for product development or testing.

The file anonymization method in this embodiment is performed by the storage device. The storage device may receive the file read command sent by the host, and obtain the to-be-read file in response to the file read command, where anonymization processing is completed on the at least some data blocks in the to-be-read file, and then perform anonymization processing on the data block on which anonymization processing is not performed in the to-be-read file, and send, to the host, the to-be-read file on which anonymization processing is completed, so that incremental anonymization can be performed on the to-be-read file, and a previous anonymization result can be fully utilized, efficiency of file anonymization is improved. In addition, online anonymization and offline anonymization can be combined so that a product development or testing activity can be performed at any time.

In a possible implementation, the to-be-read file includes an anonymization mark, and the anonymization mark indicates whether anonymization processing is completed on the to-be-read file.

The method may further include: before the performing anonymization processing on a data block on which anonymization processing is not performed in the to-be-read file, determining, based on the anonymization mark, that the to-be-read file is a file on which anonymization processing is not completed.

In this embodiment, the to-be-read file has the anonymization mark, and the anonymization mark may be used to indicate whether anonymization processing is completed on the to-be-read file. For example, the anonymization mark may be set to 1 or 0. If the anonymization mark is 1, it indicates that anonymization processing is completed on the to-be-read file, that is, anonymization processing is completed on all data blocks of the to-be-read file. If the anonymization mark is 0, it indicates that anonymization processing is not completed on the to-be-read file, that is, anonymization processing is not completed on at least one data block in the to-be-read file. Alternatively, if the anonymization mark is 1, it indicates that anonymization processing is not completed on the to-be-read file, and if the anonymization mark is 0, it indicates that anonymization processing is completed on the to-be-read file.

It should be noted that the anonymization mark may alternatively be set to another value. Persons skilled in the art may set, based on an actual situation, a value of the anonymization mark and an anonymization status corresponding to each value. This is not limited in the present disclosure.

When the to-be-read file includes an anonymization mark, before anonymization processing is performed on a data block on which anonymization processing is not performed in the to-be-read file, it may be determined, based on the anonymization mark, that the to-be-read file is a file on which anonymization processing is not completed. For example, the anonymization mark may be set to 1 (indicating that anonymization processing is completed) or 0 (indicating that anonymization processing is not completed). Whether the anonymization mark of the to-be-read file is 0 may be determined. When the anonymization mark of the to-be-read file is 0, it may be determined that the to-be-read file is a file on which anonymization processing is not completed, and then step S13 may be performed in which anonymization processing is performed on a data block on which anonymization processing is not performed in the to-be-read file. When the anonymization mark of the to-be-read file is 1, anonymization processing does not need to be performed, and the to-be-read file may be directly sent to the host.

According to this embodiment, the to-be-read file has the anonymization mark, and the anonymization status of the to-be-read file may be determined based on the anonymization mark, so that management and identification of the anonymization status of the to-be-read file can be implemented.

In a possible implementation, the method may further include: obtaining a bitmap of the to-be-read file, where the bitmap indicates whether anonymization processing is completed on each data block included in the to-be-read file; and identifying, based on the bitmap, the data block on which anonymization processing is not performed in the to-be-read file.

In this embodiment, the bitmap may be used to indicate whether anonymization processing is completed on each data block included in the to-be-read file. The bitmap may include several small grids, each small grid corresponds to an address of a data block in the to-be-read file, each small grid records a flag bit whose value is 0 or 1, and the flag bit may be used to indicate whether anonymization processing is completed on the data block stored in the address corresponding to the small grid that records the flag bit. A quantity of small grids in the bitmap of the to-be-read file is consistent with a quantity of data blocks included in the to-be-read file.

A value of the flag bit in the bitmap may be 1 or 0. 1 may be used to indicate that anonymization processing is completed on a corresponding data block, and 0 may be used to indicate that anonymization processing is not completed on a corresponding data block; or 1 may be used to indicate that anonymization processing is not completed on a corresponding data block, and 0 may be used to indicate that anonymization processing is completed on a corresponding data block.

It should be noted that persons skilled in the art may determine, based on an actual situation, a value of a flag bit in the bitmap and an anonymization status of a data block corresponding to each value. This is not limited in the present disclosure.

In this embodiment, the bitmap of the to-be-read file may be obtained. Based on the bitmap, the data block on which anonymization processing is not performed in the to-be-read file is identified. For example, if a value of a flag bit in the bitmap of the to-be-read file is 1 (indicating that anonymization processing is completed on a corresponding data block) or 0 (indicating that anonymization processing is not completed on a corresponding data block), it may be determined whether a value of each flag bit in the bitmap is 0, and a data block corresponding to the flag bit whose value is 0 is determined as a data block on which anonymization processing is not performed in the to-be-read file.

According to this embodiment, the bitmap may be set for the to-be-read file, and the data block on which anonymization processing is not performed in the to-be-read file is determined by identifying the bitmap of the to-be-read file, which is simple and fast, thereby improving processing efficiency.

In a possible implementation, the method may further include: modifying a flag bit corresponding to a data block on which anonymization processing is completed in the bitmap, to indicate that anonymization processing is completed on the corresponding data block.

In this embodiment, for the data block on which anonymization processing is completed in the to-be-read file, a flag bit corresponding to the data block on which anonymization processing is completed in the bitmap may be modified, to indicate that anonymization processing is completed on the data block. In this way, the bitmap may be updated in time based on a change of the anonymization status of the data block in the to-be-read file, to improve accuracy of the bitmap of the to-be-read file.

In a possible implementation, the method may further include: modifying the anonymization mark of the to-be-read file on which anonymization processing is completed, to indicate that anonymization processing is completed on the to-be-read file.

In this embodiment, when anonymization processing is completed on the to-be-read file, that is, when the bitmap of the to-be-read file indicates that anonymization processing is completed on each data block included in the to-be-read file, the anonymization mark of the to-be-read file may be modified to indicate that anonymization processing is completed on the to-be-read file. In this way, the anonymization mark of the to-be-read file may be updated in time based on a change of the anonymization status of the to-be-read file, so that accuracy of the anonymization mark of the to-be-read file can be improved.

In a possible implementation, an anonymization metafile may be further set for the to-be-read file, and is used to mark an anonymization status of the to-be-read file and an anonymization status of each data block included in the to-be-read file. There are a plurality of representation manners of the anonymization metafile, for example, a bitmap, an array, a matrix, and a tensor. A specific representation manner of the anonymization metafile is not limited in the present disclosure.

In a possible implementation, the anonymization metafile of the to-be-read file may include an anonymization mark and a bitmap. The anonymization mark and the bitmap are similar to the foregoing anonymization mark and bitmap, and details are not described herein again.

In a possible implementation, incremental anonymization may be performed in a manner of combining online anonymization and offline anonymization, or in a manner of combining a plurality of times of online anonymization. Incremental anonymization combining online anonymization and offline anonymization may include: performing offline anonymization first and then online anonymization on backup data, performing online anonymization first and then offline anonymization on backup data, or performing online anonymization a plurality of times and offline anonymization a plurality of times on backup data, that is, anonymization processing on backup data is switched between offline anonymization and online anonymization a plurality of times.

An exemplary process of performing offline anonymization first and then online anonymization on the backup data is similar to the foregoing processing process, and details are not described again herein.

Performing online anonymization first and then offline anonymization on the backup data may be as follows: Anonymization processing is not performed on the backup data before product development or testing starts. In this case, after product development or testing starts, when the host reads a file or reads a data block in the file, online anonymization may be performed on the to-be-read file or data block, and then the file or the data block is sent to the host. In addition, the file or data block on which anonymization processing is completed is stored and an anonymization status of the file or data block is updated. Then, when product development or testing is stopped, offline anonymization is performed on a file or a data block on which anonymization processing is not performed in the backup data.

Performing online anonymization a plurality of times and offline anonymization a plurality of times on the backup data may be as follows: When product development or testing is not performed, for example, before product development or testing starts or when product development or testing is stopped, offline anonymization is performed on a file or a data block on which anonymization processing is not performed in the backup data, the file or the data block on which anonymization processing is completed is stored, and an anonymization status of the file or data block is updated. When product development or testing needs to be performed, offline anonymization may be stopped at any time, and online anonymization is performed on a file or data block that is read by the host and on which anonymization processing is not performed, and the file or data block on which anonymization is completed is stored, an anonymization status state of the file or data block is stored. Therefore, anonymization processing on the backup data is switched between offline anonymization and online anonymization a plurality of times, until anonymization processing is completed on all files in the backup data.

Incremental anonymization combined with a plurality of times of online anonymization may be as follows: During product development or testing, when a host reads a file or a data block from the backup data for a plurality of times, online anonymization may be performed on a file or a data block read by the host each time, and after the file or the data block is sent to the host, a file or a data block on which anonymization processing is completed is stored, and an anonymization status of the file or the data block is updated. Therefore, when the host reads a file or a data block next time, an anonymization status of the to-be-read file or data block can be determined based on a latest anonymization status, in addition, online anonymization is performed on a file or a data block on which anonymization processing is not performed, so that online anonymization is performed based on previous online anonymization each time, and incremental anonymization is implemented between a plurality of times of online anonymization.

With reference to exemplary examples, the following separately describes, by using examples, a file anonymization method combining online anonymization and offline anonymization and a file anonymization method combining a plurality of times of online anonymization.

Figure 5:
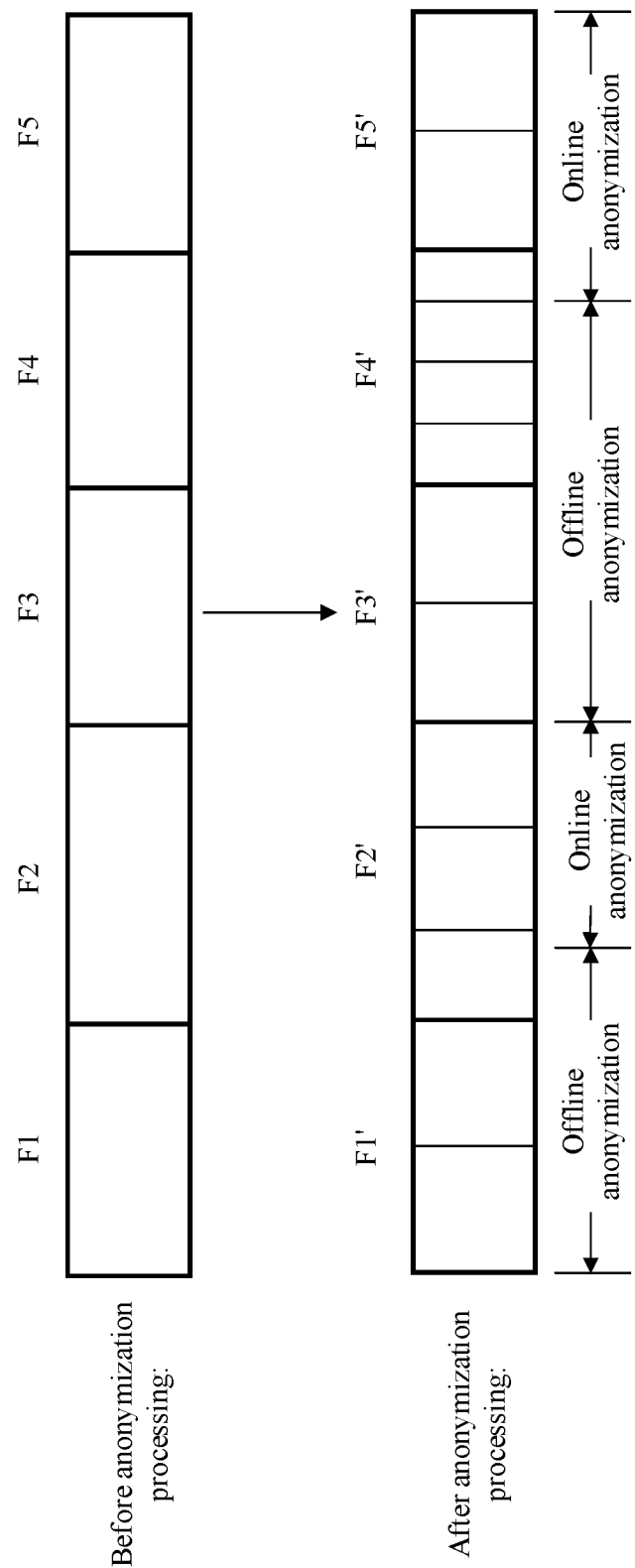
FIG. 5 is a schematic diagram of application of a file anonymization method according to an embodiment of the present disclosure.

FIG. 5 is a schematic diagram of application of a file anonymization method according to an embodiment of the present disclosure. As shown in FIG. 5, backup data existing before anonymization processing includes five files: F1, F2, F3, F4, and F5. The backup data is used for product development or testing. Before product development or testing starts, offline anonymization is performed on the backup data, and a file on which anonymization processing is completed is stored. When anonymization processing on F1 is completed through offline anonymization and anonymization processing is being performed on F2 (for example, F2 includes three data blocks, anonymization processing is completed on one data block, and anonymization processing is not performed on the other two), a developer/tester starts product development or testing. In this case, offline anonymization may be stopped, F1 (that is, F1') on which anonymization processing is completed and F2 that includes one data block on which anonymization processing is completed are stored, and anonymization marks and bitmaps of F1 and F2 are updated. Anonymization processing is switched from offline anonymization to online anonymization. Storage paths or storage locations of the backup data, a file (for example, F1') on which anonymization processing is completed, and a file (for example, F2) on which anonymization processing is completed partially are different.

During product development or testing, the host reads F2. The storage device reads F2 that includes one data block on which anonymization processing is completed and performs online anonymization processing on two data blocks on which anonymization processing is not completed in F2. After anonymization processing is completed, the storage device sends, to the host, F2 (that is, F2') on which anonymization processing is completed, updates the anonymization mark and bitmap of F2, and stores F2'.

After F2 is read, when product development or testing is suspended, offline anonymization may continue to be performed on the backup data. When anonymization processing on F3 is completed through offline anonymization and anonymization processing is being performed on F4 (for example, F4 includes four data blocks, anonymization processing is completed on three data blocks, and anonymization processing is not performed on the remaining one), the developer/tester starts product development or testing again. In this case, offline anonymization may be stopped, F3 (that is, F3') on which anonymization processing is completed and F4 that includes three data blocks on which anonymization processing is completed are stored, and anonymization marks and bitmaps of F3 and F4 are updated. Anonymization processing is switched from offline anonymization to online anonymization.

During product development or testing, the host reads F4. The storage device reads F4 that includes three data blocks on which anonymization processing is completed and performs online anonymization on one data block on which anonymization processing is not completed in F4. After anonymization processing is completed, the storage device sends, to the host, F4 (that is, F4') on which anonymization processing is completed updates the anonymization mark and bitmap of F4, and stores F4'. Then, when the host reads F5, the storage device reads F5 from the backup data, performs online anonymization on F5, sends, to the host, F5 (that is, F5') on which anonymization processing is completed, updates an anonymization mark and a bitmap of F5, and stores F5'.

In the file anonymization processing in this embodiment, online anonymization and offline anonymization may be combined, a result of anonymization processing each time is stored, and an anonymization status of a file is updated, so that online anonymization may use a processing result of offline anonymization, and product development or testing can be started but does not need to wait for offline anonymization to complete, and offline anonymization may use a processing result of online anonymization to perform incremental file anonymization combining online anonymization and offline anonymization. In this way, a purified backup is gradually formed when anonymization processing is completed on all files.

Figure 6:
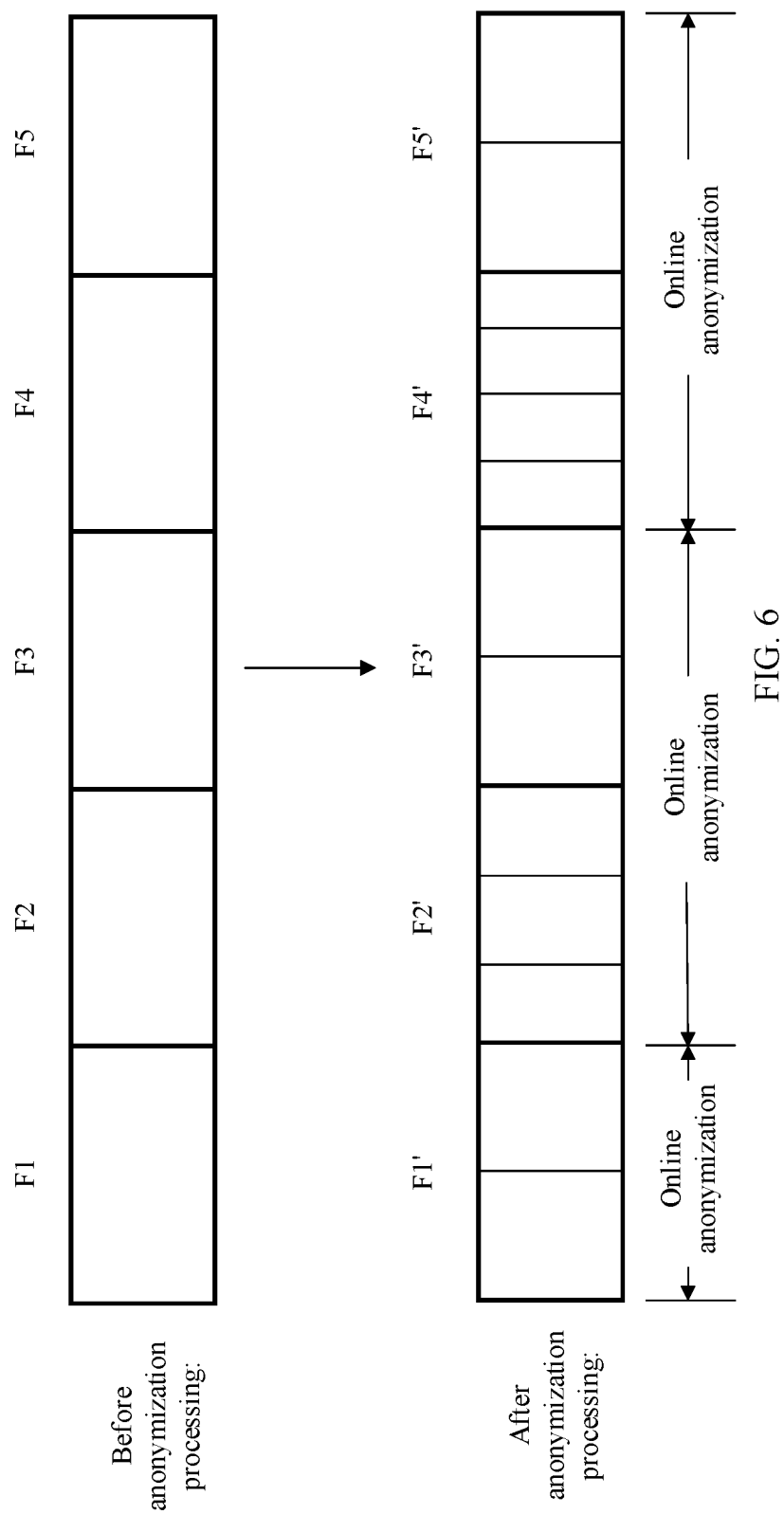
FIG. 6 is a schematic diagram of application of a file anonymization method according to an embodiment of the present disclosure.

FIG. 6 is a schematic diagram of application of a file anonymization method according to an embodiment of the present disclosure. As shown in FIG. 6, backup data existing before anonymization processing includes five files: F1, F2, F3, F4, and F5. The backup data is used for product development or testing. Offline anonymization is not performed before product development or testing. During product development or testing, when the host reads a file for the first time, F1 is read. The storage device reads F1 from the backup data, performs online anonymization on F1, sends, to the host, F1 (that is, F1') on which anonymization processing is completed, updates an anonymization mark and a bitmap of F1, and stores F1'.

When the host reads a file for the second time, the files F2 and F3 are read. The storage device reads F2 and F3 from the backup data, performs online anonymization on F2 and F3 separately, sends, to the host, F2 (that is, F2') on which anonymization processing is completed and F3 (that is, F3') on which anonymization processing is completed, updates anonymization marks and bitmaps of F2 and F3, and stores F2' and F3'.

When the host reads a file for the third time, the files F4 and F5 are read. The storage device reads F4 and F5 from the backup data, performs online anonymization on F4 and F5 separately, sends, to the host, F4 (that is, F4') on which anonymization processing is completed and F5 (that is, F5') on which anonymization processing is completed, updates anonymization marks and bitmaps of F4 and F5, and stores F4' and F5'.

In this embodiment, when only online anonymization is performed in file anonymization processing, a file on which anonymization processing is completed may also be stored each time, so that a plurality of times of online anonymization may also be performed incrementally.

Figure 7:
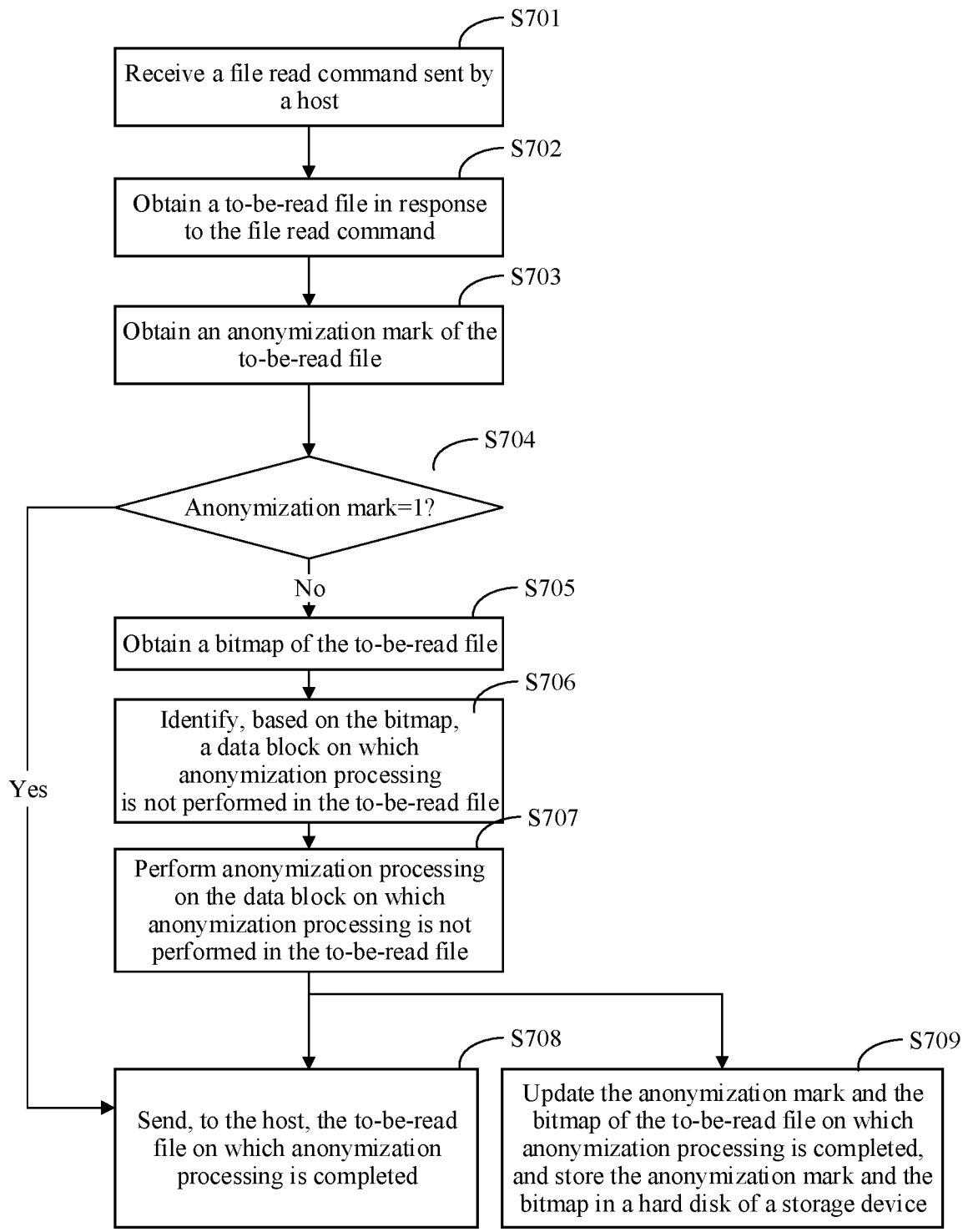
FIG. 7 is a schematic diagram of a processing process of a file anonymization method according to an embodiment of the present disclosure.

FIG. 7 is a schematic diagram of a processing process of a file anonymization method according to an embodiment of the present disclosure. As shown in FIG. 7, during product development or testing process, a host may read a file from a storage device through an I/O path. The storage device may receive, in step S701, a file read command sent by the host. In step S702, in response to the file read command, the storage device obtains a to-be-read file, where anonymization processing is completed on at least some data blocks in the to-be-read file. In step S703, the storage device obtains an anonymization mark of the to-be-read file, and determines whether an anonymization mark is 1 in step S704. A value of the anonymization mark is 1 or 0. When the anonymization mark is 1, it indicates that anonymization processing is completed on the to-be-read file. When the anonymization mark is 0, it indicates that anonymization processing is not completed on the to-be-read file.

When the anonymization mark is 1, anonymization processing is completed on the to-be-read file, and the storage device does not need to perform anonymization processing again, the to-be-read file on which anonymization processing is completed may be directly sent to the host in step S709.

When the anonymization mark is not 1 (that is, the anonymization mark is 0), anonymization processing is not completed on the to-be-read file, and the storage setting may perform step S705 to obtain a bitmap of the to-be-read file, and in step S706, identify, based on the bitmap, a data block on which anonymization processing is not performed in the to-be-read file, and in step S707, perform anonymization processing on the data block on which anonymization processing is not performed in the to-be-read file.

When anonymization processing is completed on all data blocks of the to-be-read file, it may be considered that anonymization processing is completed on the to-be-processed file, and the storage device may perform step S708 to send, to the host, the to-be-read file on which anonymization processing is completed, for product development or testing.

After step S707, step S709 may be further performed in which the anonymization mark and the bitmap of the to-be-read file on which anonymization processing is completed are updated, and the anonymization mark and the bitmap are stored in a hard disk of the storage device.

In this embodiment, in online anonymization, the anonymization status of the to-be-read file and an anonymization status of each data block included in the to-be-read file may be identified in real time by using the anonymization mark and the bitmap of the to-be-read file, to reduce unnecessary or repeated anonymization processing and reduce impact on a user production environment (for example, a product development or a test environment).

In a possible implementation, when the host and the storage device support independent access to a data block in the to-be-read file, it may be determined, based on a flag bit that is in the bitmap of the to-be-read file and that is corresponding to a to-be-accessed data block, whether anonymization processing is completed on the data block. If the flag bit indicates that anonymization processing is completed on the data block (for example, the flag bit is 1), the storage device may directly send the data block to the host, and does not need to perform anonymization processing again. If the flag bit indicates that anonymization processing is not completed on the data block (for example, the flag bit is 0), the storage device may perform anonymization processing on the data block, and send the data block on which anonymization processing is completed to the host. In addition, the storage device may further store the data block on which anonymization processing is completed in the hard disk, and update the corresponding flag bit in the bitmap.

In a possible implementation, when storing the file or data block on which anonymization processing is completed in the hard disk, the storage device may also store attribute information of the file or data block on which anonymization processing is completed in the hard disk. The attribute information of the file or the data block may include a name, a size (such as a magnitude and a length), a location, and the like of the file or the data block. Specific attribute information of the file or the data block is not limited in the present disclosure.

According to the file anonymization method according to this embodiment of the present disclosure, online anonymization and offline anonymization may be combined, and the file or the data block on which anonymization processing is completed is stored, so that not only incremental anonymization of backup data used during product development or testing can be implemented, file anonymization processing efficiency can be improved, impact of online anonymization on a user production environment (for example, a user development environment or a test environment) can be reduced, and anonymization processing can be switched between online anonymization and offline anonymization at any time. In this way, a product development or testing activity can be performed at any time.

Figure 8:
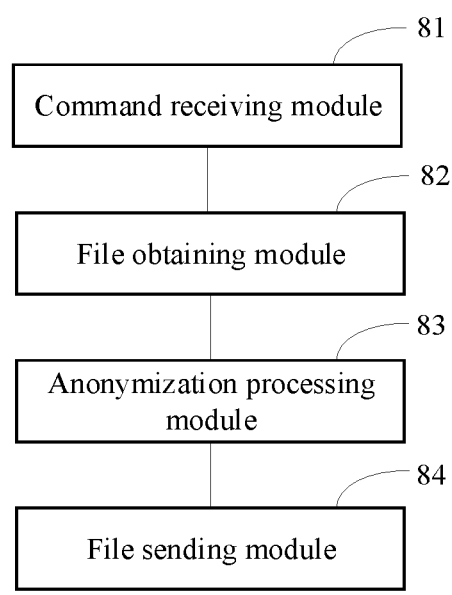
FIG. 8 is a block diagram of a file anonymization apparatus according to an embodiment of the present disclosure.

FIG. 8 is a block diagram of a file anonymization apparatus according to an embodiment of the present disclosure. As shown in FIG. 8, the file anonymization apparatus is applied to a storage device, and may be implemented by using an anonymization engine. The apparatus includes:

- a command receiving module 81, configured to receive a file read command sent by a host, where the file read command is used to request a to-be-read file;
- a file obtaining module 82, configured to obtain the to-be-read file in response to the file read command, where anonymization processing is completed on at least some data blocks in the to-be-read file;
- an anonymization processing module 83, configured to perform anonymization processing on a data block on which anonymization processing is not performed in the to-be-read file; and
- a file sending module 84, configured to send, to the host, the to-be-read file on which anonymization processing is completed.

In a possible implementation, the file anonymization apparatus may be located in the storage device, and may be implemented by using hardware, software, or a combination of software and hardware. The file anonymization apparatus may alternatively be located outside the storage device and may be implemented as an independent anonymization device, and the anonymization device may be any form of electronic device, such as a server, a desktop computer, a mobile device, and any other type of computing device that includes a processor and a memory. A location and a specific implementation of the file anonymization apparatus are not limited in the present disclosure.

In a possible implementation, the apparatus may further include: a file storage module, configured to store the to-be-read file on which anonymization processing is completed in a hard disk of the storage device.

In a possible implementation, the apparatus may further include: a bitmap obtaining module, configured to obtain a bitmap of the to-be-read file, where the bitmap indicates whether anonymization processing is completed on each data block included in the to-be-read file; and a data block identification module, configured to identify, based on the bitmap, a data block on which anonymization processing is not performed in the to-be-read file.

In a possible implementation, the to-be-read file includes an anonymization mark, and the anonymization mark indicates whether anonymization processing is completed on the to-be-read file.

The apparatus may further include: a file anonymization identification module, configured to: before anonymization processing is performed on the data block on which anonymization processing is not performed in the to-be-read file, determine, based on the anonymization mark, that the to-be-read file is a file on which anonymization processing is not completed.

In a possible implementation, the apparatus may further include: an anonymization mark modifying module, configured to modify the anonymization mark of the to-be-read file on which anonymization processing is completed, to indicate that anonymization processing is completed on the to-be-read file.

In a possible implementation, the apparatus may further include: a bitmap modifying module, configured to modify a flag bit corresponding to a data block on which anonymization processing is completed in the bitmap, to indicate that anonymization processing is completed on a corresponding data block.

In a possible implementation, anonymization processing is completed on the at least some data blocks in the to-be-read file through offline anonymization.

In a possible implementation, the to-be-read file may include at least one of a text file, a report file, a picture file, an audio file, and a video file.

In a possible implementation, the foregoing modules in the file anonymization apparatus may be implemented by invoking program instructions by a CPU.

It should be noted that functions of or modules included in the apparatus provided in this embodiment of the present disclosure may be configured to perform the method described in the foregoing method embodiment. For exemplary implementation, refer to the description in the foregoing method embodiment. For brevity, details are not described herein again.

An embodiment of the present disclosure provides a file anonymization apparatus, including a processor and a memory that is configured to store processor executable instructions, where the processor is configured to implement the foregoing method when executing the instruction.

An embodiment of the present disclosure provides a non-volatile computer-readable storage medium. The non-volatile computer-readable storage medium stores computer program instructions. When the computer program instructions are executed by a processor, the foregoing method is implemented.

An embodiment of the present disclosure provides a computer program product, including computer-readable code or a non-volatile computer-readable storage medium carrying computer-readable code. When the computer-readable code runs in a processor of an electronic device, the processor in the electronic device performs the foregoing method. The computer-readable storage medium can be a tangible device that can retain and store instructions for use by an instruction execution device. The computer-readable storage medium may be, for example, an electrical storage device, a magnetic storage device, an optical storage device, an electromagnetic storage device, a semiconductor storage device, or any suitable combination thereof. More examples (non-exhaustive list) of computer-readable storage media include: a portable computer disk, a hard disk, a random access memory (RAM), a read-only memory (ROM), an erasable programmable read-only memory (EPROM, or flash memory), a static random-access memory (SRAM), a portable compact disk read-only memory (CD-ROM), a digital versatile disk (DVD), a memory stick, a floppy disk, a mechanical coding device, for example, a punching card or a groove protrusion structure that stores instructions, and any suitable combination thereof.

Computer-readable program instructions or code described herein can be downloaded to respective computing/processing devices from a computer-readable storage medium or to an external computer or external storage device via a network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instruction used to perform the operations in the present disclosure may be an assembly instruction, an instruction set architecture (ISA) instruction, a machine instruction, a machine-related instruction, microcode, a firmware instruction, status setting data, or source code or object code written in any combination of one or more programming languages. The programming language includes an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer through any type of network, including a local area network (LAN) or a wide area network (WAN), or may be connected to an external computer (for example, through the Internet by using an Internet service provider). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of the present disclosure.

The various aspects of the present disclosure are described herein with reference to the flowcharts and/or block diagrams of the method, the apparatus (system), and the computer program product according to embodiments of the present disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and block diagrams in the accompanying drawings show possible implementation of system architectures, functions, and operations of apparatuses, systems, methods, and computer program products according to a plurality of embodiments of the present disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may be actually executed substantially in parallel, and may sometimes be executed in a reverse order, depending on a function involved.

It should also be noted that each block in the block diagram and/or the flowchart, and a combination of blocks in the block diagram and/or the flowchart may be implemented by hardware (for example, a circuit or an application-specific integrated circuit (ASIC)) that performs a corresponding function or action, or may be implemented by a combination of hardware and software, for example, firmware.

Although the present disclosure is described with reference to the embodiments, in a process of implementing the present disclosure that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

The foregoing has described embodiments of the present disclosure. The foregoing descriptions are examples but are not exhaustive, and are not limited to the disclosed embodiments. Many modifications and changes are apparent to persons of ordinary skill in the art without departing from the scope of the illustrated embodiments. The selection of terms used herein is intended to best explain principles of embodiments, practical applications, or improvements to technologies in the market, or to enable other persons of ordinary skill in the art to understand the embodiments disclosed herein.

What is claimed is:

1. A method for file anonymization, performed by a storage device, the method comprising:
    receiving a file read command sent by a host, wherein the file read command is used to request a to-be-read file, the to-be-read file comprises a plurality of data blocks;
    obtaining the to-be-read file in response to the file read command, wherein the plurality of data blocks in the to-be-read file comprises one or more first data blocks that do not have anonymization processing performed thereon and one or more second data blocks that have anonymization processing completed thereon;
    performing anonymization processing on a first data block in the to-be-read file; and
    sending, to the host, the to-be-read file on which anonymization processing is completed.

2. The method according to claim 1, further comprising:
storing the to-be-read file on which anonymization processing is completed in a hard disk of the storage device.

3. The method according to claim 1, further comprising:
obtaining a bitmap of the to-be-read file, wherein the bitmap indicates whether anonymization processing is completed on each data block of the plurality of data blocks comprised in the to-be-read file; and
identifying, based on the bitmap, the first data block in the to-be-read file.

4. The method according to claim 3, further comprising:
modifying, in the bitmap, a flag bit corresponding to a data block of the plurality of data blocks, to indicate that anonymization processing is completed on the particular data block.

5. The method according to claim 1, wherein the to-be-read file comprises an anonymization mark, and the anonymization mark indicates whether anonymization processing is completed on the to-be-read file; and
the method further comprises:
before performing the anonymization processing on the first data block in the to-be-read file, determining, based on the anonymization mark, that the to-be-read file is a file on which anonymization processing is not completed.

6. The method according to claim 5, further comprising:
modifying the anonymization mark of the to-be-read file on which anonymization processing is completed, to indicate that anonymization processing is completed on the to-be-read file.

7. The method according to claim 1, wherein the anonymization processing on the one or more second data blocks in the to-be-read file is completed through offline anonymization.

8. The method according to claim 1, wherein the to-be-read file comprises at least one of a text file, a report file, a picture file, an audio file, or a video file.

9. An apparatus for file anonymization, comprising:
a processor; and
a memory, configured to store processor executable instructions,
wherein the processor is configured to:
receive a file read command sent by a host, wherein the file read command is used to request a to-be-read file, the to-be-read file comprises a plurality of data blocks;
obtain the to-be-read file in response to the file read command, wherein the plurality of data blocks in the to-be-read file comprises one or more first data blocks that do not have anonymization processing performed thereon and one or more second data blocks that have anonymization processing completed thereon;
perform anonymization processing on a first data block in the to-be-read file; and
send, to the host, the to-be-read file on which anonymization processing is completed.

10. The file anonymization apparatus according to claim 9, wherein the processor is further configured to store the to-be-read file on which anonymization processing is completed in a hard disk of the storage device.

11. The file anonymization apparatus according to claim 9, wherein the processor is further configured to:
obtain a bitmap of the to-be-read file, wherein the bitmap indicates whether anonymization processing is completed on each data block of the plurality of data blocks comprised in the to-be-read file; and
identify, based on the bitmap, the first data block in the to-be-read file.

12. The file anonymization apparatus according to claim 11, wherein the processor is further configured to:
modify, in the bitmap, a flag bit corresponding to a data block of the plurality of data blocks, to indicate that anonymization processing is completed on the particular data block.

13. The file anonymization apparatus according to claim 9, wherein the to-be-read file comprises an anonymization mark, and the anonymization mark indicates whether anonymization processing is completed on the to-be-read file, and wherein before performing the anonymization processing on the first data block in the to-be-read file, the processor is further configured to:
determine, based on the anonymization mark, that the to-be-read file is a file on which anonymization processing is not completed.

14. The file anonymization apparatus according to claim 13, wherein the processor is further configured to:
modify the anonymization mark of the to-be-read file on which anonymization processing is completed, to indicate that anonymization processing is completed on the to-be-read file.

15. The file anonymization apparatus according to claim 9, wherein the anonymization processing on the one or more second data blocks in the to-be-read file is completed through offline anonymization.

16. The file anonymization apparatus according to claim 9, wherein the to-be-read file comprises at least one of a text file, a report file, a picture file, an audio file, or a video file.

17. A non-transitory computer-readable storage medium, storing computer-executable instructions, wherein the instructions, when executed, cause one or more processors to perform:
receiving a file read command sent by a host, wherein the file read command is used to request a to-be-read file, the to-be-read file comprises a plurality of data blocks;
obtaining the to-be-read file in response to the file read command, wherein the plurality of data blocks in the to-be-read file comprises one or more first data blocks that do not have anonymization processing performed thereon and one or more second data blocks that have anonymization processing completed thereon;
performing anonymization processing on a first data block in the to-be-read file; and
sending, to the host, the to-be-read file on which anonymization processing is completed.

18. The non-transitory computer-readable storage medium according to claim 17, wherein the instructions, when executed, cause the one or more processors to further perform:
enabling the storage device to store the to-be-read file on which anonymization processing is completed in a hard disk of the storage device.

19. The non-transitory computer-readable storage medium according to claim 17, wherein the instructions, when executed, cause the one or more processors to further perform:
obtaining a bitmap of the to-be-read file, wherein the bitmap indicates whether anonymization processing is completed on each data block of the plurality of data blocks comprised in the to-be-read file; and
identifying, based on the bitmap, the first data block in the to-be-read file.

20. The non-transitory computer-readable storage medium according to claim 17, wherein the anonymization processing on the one or more second data blocks in the to-be-read file is completed through offline anonymization.

* * * * *